United States Patent [19]

Yamamoto

[11] Patent Number: 5,276,959

[45] Date of Patent: Jan. 11, 1994

[54] METHOD OF MANUFACTURING A MAGNETIC TAPE HEAD

[75] Inventor: Tatsushi Yamamoto, Nara, Japan

[73] Assignee: Sharp Kabushiki Kaisha, Osaka, Japan

[21] Appl. No.: 869,539

[22] Filed: Apr. 15, 1992

[30] Foreign Application Priority Data

Apr. 16, 1991 [JP] Japan .................................. 3-084191

[51] Int. Cl.$^5$ ............................................... G11B 5/42
[52] U.S. Cl. .................................... 29/603; 360/121; 360/125
[58] Field of Search ................... 29/603; 360/119-121, 125-127

[56] References Cited

FOREIGN PATENT DOCUMENTS

| | | |
|---|---|---|
| 0400966 | 12/1990 | European Pat. Off. . |
| 0448033 | 9/1991 | European Pat. Off. . |
| 61-80512 | 4/1986 | Japan . |
| 62-146411 | 6/1987 | Japan . |
| 62-170007 | 7/1987 | Japan . |
| 64-33709 | 2/1989 | Japan . |
| 1-113909 | 5/1989 | Japan . |
| 1-211309 | 8/1989 | Japan . |
| 1-235011 | 9/1989 | Japan . |
| 2-40117 | 2/1990 | Japan . |
| 2-108208 | 4/1990 | Japan . |
| 2-128309 | 5/1990 | Japan . |
| 3-40207 | 2/1991 | Japan . |
| 3-144904 | 6/1991 | Japan . |

OTHER PUBLICATIONS

English Abstract corresponding to Japanese Publication No. 3-40207, dated Feb. 21, 1991.
English Abstract corresponding to Japanese Publication No. 3-144904, dated Jun. 20, 1991.
English Abstract corresponding to Japanese Publication No. 2-40117, dated Feb. 8, 1990.
English Abstract corresponding to Japanese Publication No. 2-108208, dated Apr. 20, 1990.
English Abstract corresponding to Japanese Publication No. 2-128309, dated May 16, 1990.
English Abstract corresponding to Japan Publication No. 64-33709, dated Feb. 3, 1989.
English Abstract corresponding to Japanese Pubication No. 62-146411, dated Jun. 30, 1987.
English Abstract corresponding to Japanese Publication No. 62-170007, dated Jul. 27, 1987.
English Abstract corresponding to Japanese Pubication No. 1-113909, dated May 2, 1989.
English Abstract corresponding to Japanese Publication No. 1-211309, dated Aug. 24, 1989.
English Abstract corresponding to Japanese Publication No. 1-235011, dated Sep. 20, 1990.

*Primary Examiner*—Carl E. Hall
*Attorney, Agent, or Firm*—David G. Conlin; George W. Neuner

[57] ABSTRACT

A magnetic head includes two substrates which are provided with magnetic cores of magnetic film on their surface and are bonded on a plane so that a magnetic gap is defined between the magnetic cores, an edge part of the magnetic cores with the magnetic gap facing to a track of a recording medium being thinned from opposite sides thereof, and the magnetic cores in any other part being thicker than the edge part. In a gap facing plane where a pair of the magnetic cores join together, the magnetic cores are registered with each other so that they can be opposed to each other in a larger width in the back gap than in the front gap. As a result, even if a tolerance of a process in manufacturing is considerably loosened, a magnetic head with high core efficiency can be obtained with a high yield.

7 Claims, 11 Drawing Sheets

METHOD OF MANUFACTURING A MAGNETIC TAPE HEAD

BACKGROUND OF THE INVENTION

1. Field of the Invention

The present invention relates to a magnetic head and a method of manufacturing the same, and more specifically, it relates to a rotary type magnetic head mounted in systems, such as VCR, R-DAT and digital VCR and the like, and a method of manufacturing the same.

2. Description of the Related Art

Figure 15:
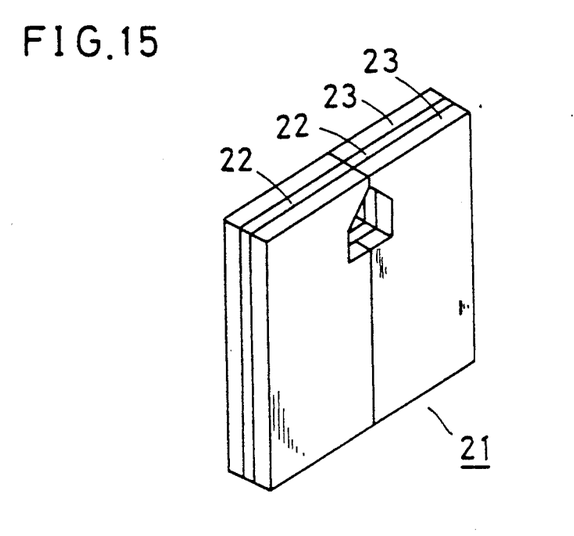
FIG. 15 is a perspective view showing a conventional magnetic head.

In recent years, as magnetic recording technology advances in developing further high-density and wideband recording, a high coercive force medium such as metal-particulate tape and the like has come to be a recording medium. Accordingly, for a core material of a magnetic head, thin film of soft magnetic alloy having a high saturation magnetic flux density is employed. With reference to the drawings, for example, a magnetic head 21 having a configuration where a soft magnetic alloy thin film 22 is sandwiched by nonmagnetic material 23 as shown in FIG. 15 is proposed, and another example having a configuration where a thickness of a core of a magnetic head in a front gap is made the same as required for a track width while thicknesses in any other parts are made larger in order to enhance a core efficiency.

The inventor of the present invention and his coworkers proposed a magnetic head disclosed in Japanese Unexamined Patent Publication Heisei No. 1-33709 and also proposed a method of manufacturing such a magnetic head. That is, a magnetic core is made thinner only in a region of which track width in the magnetic head is determined by directional particles as in ion milling.

Figure 16:
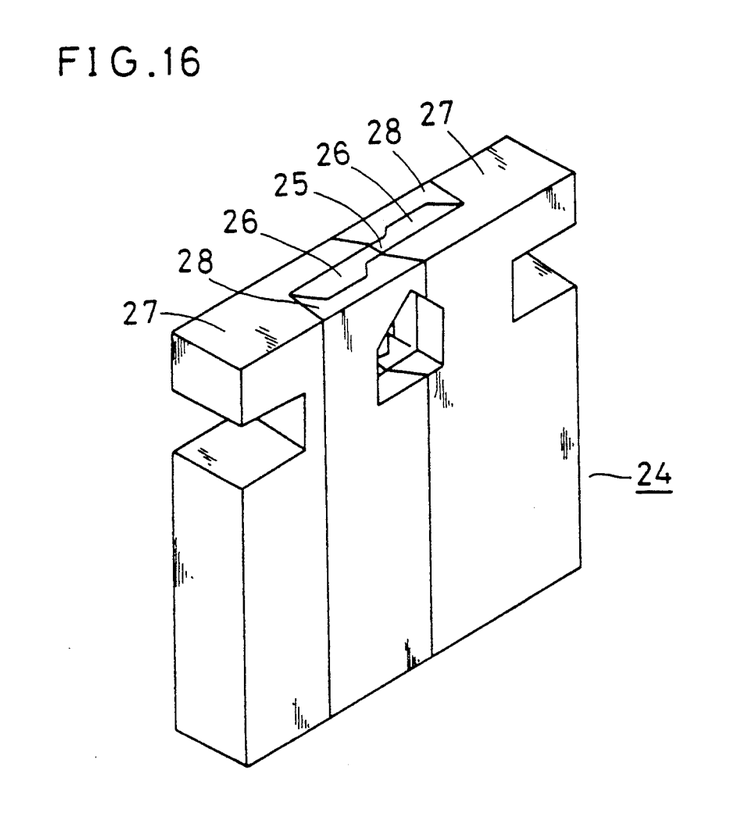
FIG. 16 is a perspective view showing another conventional magnetic head.

FIG. 16 shows a magnetic head 24 disclosed in the same Japanese Unexamined Patent Publication Heisei No. 1-33709. Referring to FIG. 16, a thin film 26 consisting of soft magnetic thin films or a combination of soft magnetic thin films and insulating thin films has a thickness corresponding to a track width in a gap region 25 while it is thicker in any other part. The magnetic core 26 having such a configuration is made large in sectional area of a magnetic core so as to enhance a core efficiency by reducing magnetic reluctance of the core.

Figure 17:
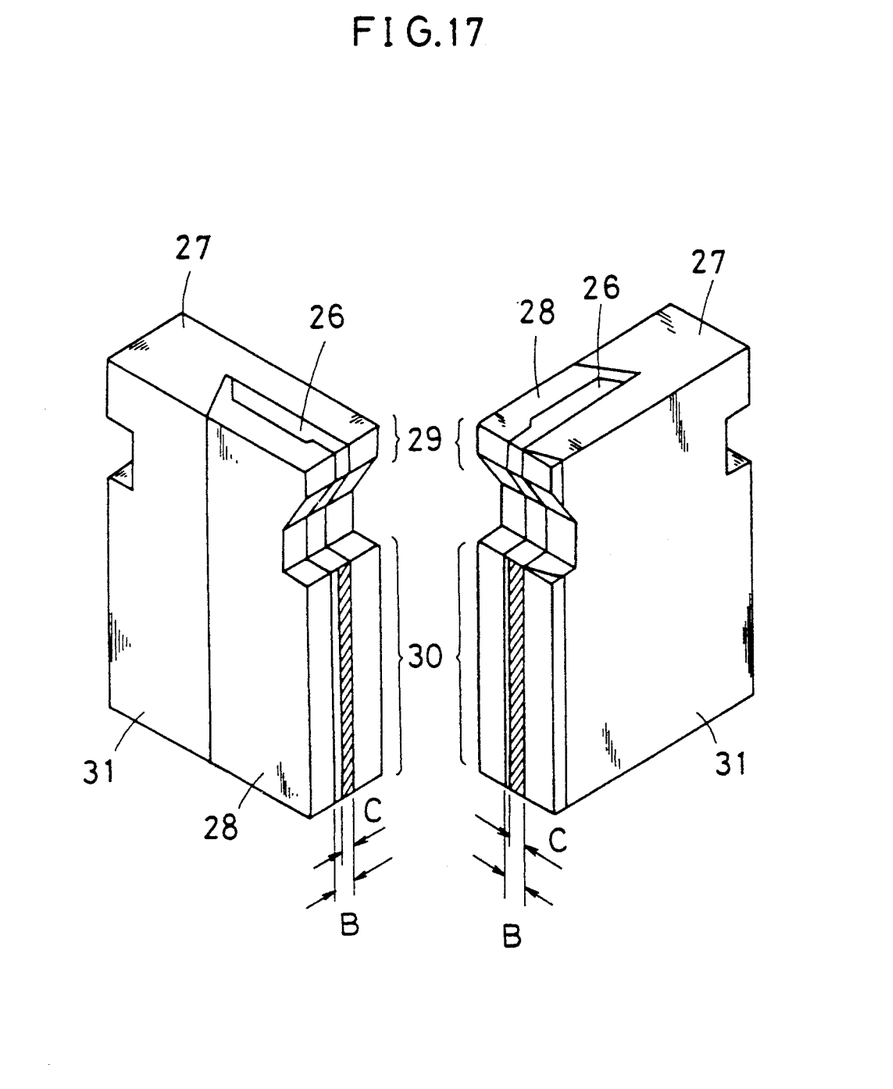
FIG. 17 is a perspective view showing a state where the magnetic head in FIG. 16 is divided at a gap facing plane, and resultant gap facing planes are exposed.

FIG. 17 is a perspective view of two halved bodies of the magnetic head 24 where it is divided into two between its gap facing planes so that resultant gap facing planes can be observed. Assuming that an ideal process accuracy can be attained, and even if thereby only a magnetic core 26 in a part (front gap) 29 on which a recording medium is to slide in the eventual magnetic head 24 is made thin in the method also disclosed in Japanese Unexamined Patent Publication Heisei No. 1-33709 as noted above, a pair of halves 31 of the magnetic head 24 have their respective magnetic cores 26 opposed to each other in merely a width C which is equivalent to the thickness of the core in the front gap 29 shown in FIG. 17 in the gap facing plane where the pair of halves of the magnetic head 24 are bonded together. In other words, although the magnetic core in a back gap 30 is thickened to and a magnetic reluctance is accordingly reduced to enhance a core efficiency of the magnetic head 24, an area of a cross-section of the magnetic core in the back gap 30 is made smaller causing larger magnetic reluctance, and consequently, there arises the problem that an effect of sufficient enhancement of a core efficiency cannot be obtained.

SUMMARY OF THE INVENTION

Accordingly, the present invention provides a magnetic head including two substrates which are provided with magnetic cores of magnetic film on their surface and are bonded on a plane so that a magnetic gap is defined between the magnetic cores, an edge part of the magnetic cores with the magnetic gap facing to a track of a recording medium being thinned from both the substrate side and the opposite thereto, and the magnetic cores in any other part being thicker than the edge part.

Also, the present invention provides a method of manufacturing a magnetic head in which two substrates provided with magnetic cores of magnetic film on their surface are bonded on a plane so that a magnetic gap is defined between the magnetic cores, comprising the steps of forming a plurality of straight V-shaped grooves in parallel with each other on upper surfaces of the substrates; forming nonmagnetic films at a specified pitch close to tops of side walls of the grooves; forming magnetic films on the side walls of the V-shaped grooves having the nonmagnetic films thereon; thinning the magnetic films from the upper to a specified thickness; filling the grooves with glass and then flattening upper surfaces of the substrates; cutting the substrates along a plane orthogonal to the V-shaped grooves to divide them into first and second substrates; forming grooves for coiling in top and bottom surfaces of each of the first and second substrates in a direction orthogonal to the V-shaped grooves; superposing the first substrate on the second substrate so that the first and second substrates have their respective upper surfaces may be in contact with each other and that the magnetic films of the first substrate and those of the second substrate together define magnetic gaps and then melting the glass in the V-shaped grooves and bonding the first and second substrates to join in a unity; and slicing the unity along a plane inclined at a specified angle related to a bonded plane between the first and second substrates.

Preferably, the nonmagnetic films are formed by a thin film formation means such as electron beam vacuum deposition, sputtering, and the like in the step of forming the non magnetic films on the side walls of the V-shaped grooves.

Preferably, the magnetic films are formed by a thin film formation means such as electron beam vacuum deposition, sputtering, and the like in the step of forming the magnetic films on the side walls of the V-shaped grooves.

Preferably, the magnetic films are treated by ion milling to be thinner in the step of thinning the magnetic films.

Preferably, the magnetic films formed on the side walls of the V-shaped grooves make strata of alternating soft magnetic metal films and electric insulating films.

Preferably, the nonmagnetic films are formed in a thickness of about ½ of a difference between a thickness of the magnetic cores required for a track width of the magnetic head and a thickness of the magnetic cores in any other part in the step of forming the nonmagnetic films on the side walls of the V-shaped grooves.

Preferably, the nonmagnetic films are of an oxide or a composite oxide, such as alumina, magnesia, steatite, forsterite, etc.

Accordingly, in the bonding plane between a pair of the magnetic cores, the magnetic cores are registered so that they may be opposed to each other in a larger width in a back gap than in a front gap, and therefore, an area of a cross-section of the magnetic cores in the back gap is larger.

DETAILED DESCRIPTION OF THE PREFERRED EMBODIMENT

The present invention will be described in detail in conjunction with preferred embodiments shown in the accompanying drawings. It is not intended that the present invention be limited to the precision of the description.

In the preferred embodiments herein, a thin film of FeAlSi family alloy is employed as a soft magnetic alloy thin film while crystalline glass is employed for a nonmagnetic substrate, however, NiFe system alloy, FeSiGa alloy, CoNbZr family alloy or the like, for example, may be employed as the soft magnetic alloy while ceramics composed of titanium oxide, strontium oxide, nickel oxide, magnesium oxide, or a compound of two or more of them may be employed for the nonmagnetic substrate. A material of the substrate may be properly selected in accordance with an adjustability of thermal expansion to a soft magnetic material and an abrasion property.

Figure 1:
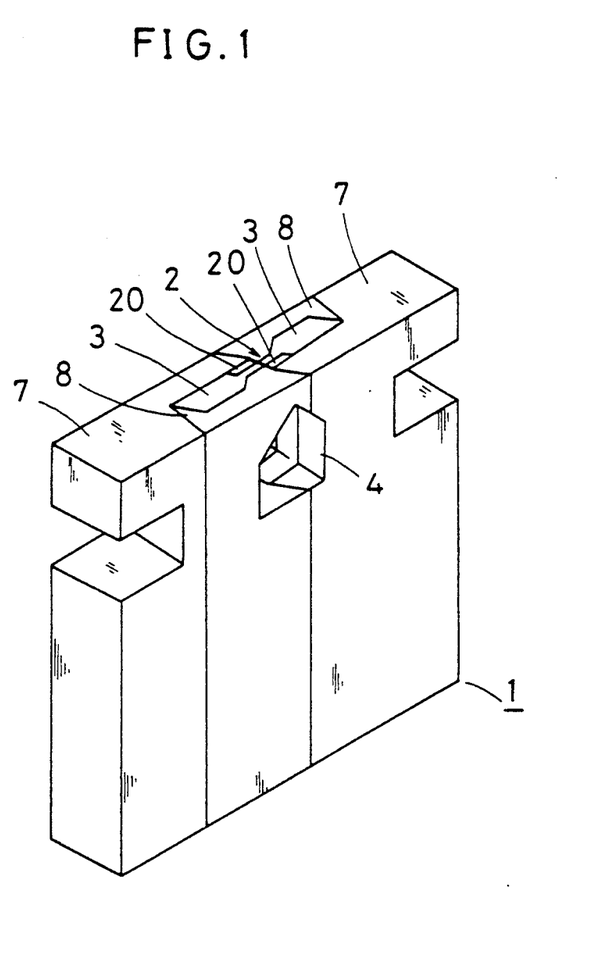
FIG. 1 is a perspective view showing a magnetic head according to the present invention.
Figure 2:
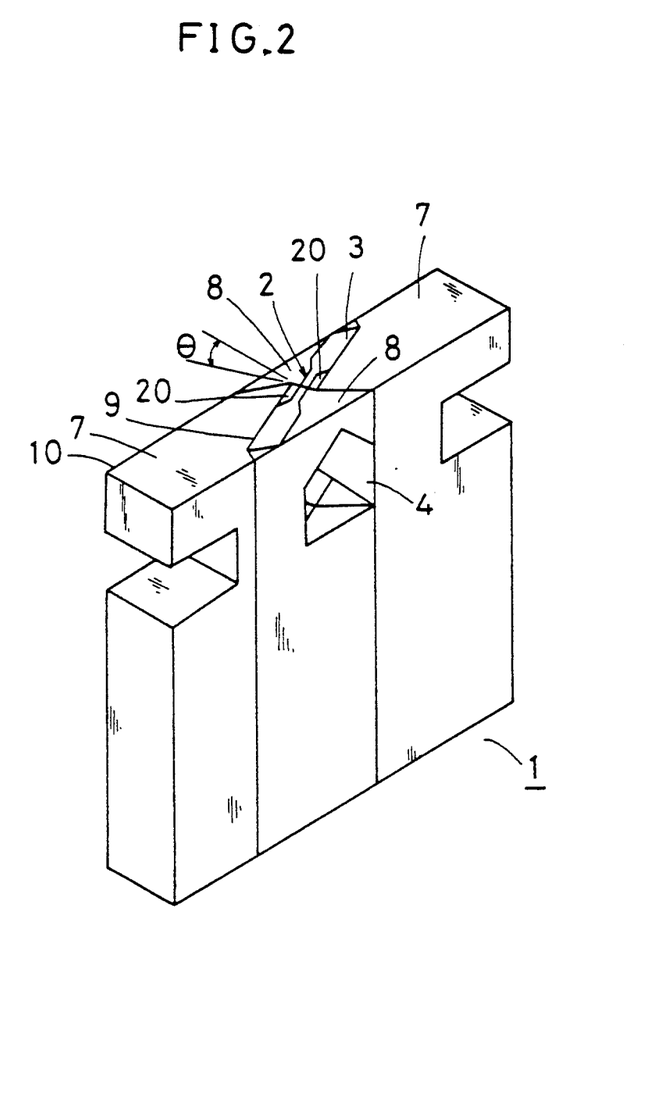
FIG. 2 is a perspective view showing a variation of the present invention.
Figure 3:
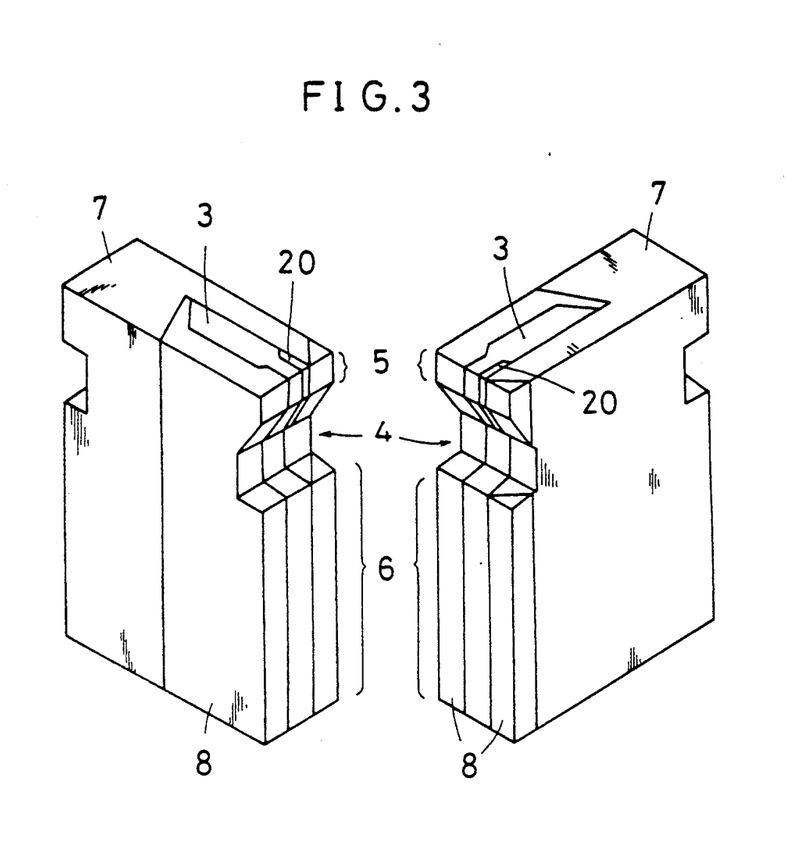
FIG. 3 is a perspective view showing a state in which a magnetic head according to the present invention is divided at a gap facing plane so that resultant gap facing planes can be observed.

FIGS. 1 and 2 are perspective views showing preferred embodiments of a magnetic head according to the present invention. In these figures, respective magnetic heads are enlarged in thickness and around a gap. FIG. 3 is a perspective view showing a magnetic head which is divided in half to have respective cutting planes with two-divided gap facing planes opposed to each other and exposed herein.

As shown in FIGS. 1 to 3, a magnetic core 3 of FeAlSi family alloy thin film has a thickness required for a track width in a front gap 5, and it is thicker in any other part. Furthermore, the magnetic core 3 in the front gap 5 is thinned because a nonmagnetic substrate 7 and glass plate 8 on opposite side cut into the magnetic core 3 from opposite sides thereof in the very part.

On the other hand, as a general configuration, the magnetic core is sandwiched by the nonmagnetic substrate 7 of crystalline glass and the low-melting-point glass 8 having an abrasion equivalent to that of the nonmagnetic substrate. Depending upon a shape and a pitch of a V-shaped groove mentioned below, an exposed surface 9 of the magnetic core 3 is slant related to an edge 10 at top of a magnetic head 1. A gap 2 is bonded by the low-melting-point glass 8. In FIGS. 1 to 3, wire to be coiled around the magnetic head 1 and a gap spacer are omitted.

Then, a method of manufacturing the magnetic head 1 will be explained with reference to FIGS. 4 to 14.

Figure 4:
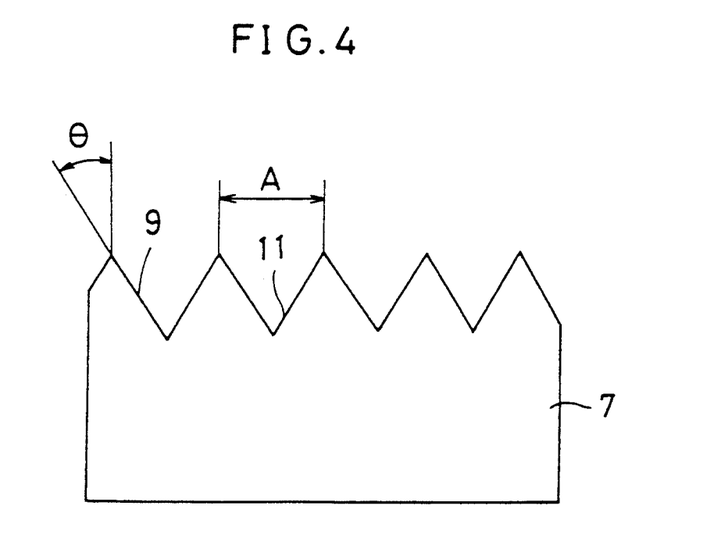
FIGS. 4 to 14 are diagrams for explaining a method of manufacturing the magnetic head according to the present invention.

First, as shown in FIG. 4, V-shaped grooves 11 are successively formed parallel to each other at a pitch A which is determined allowing for a thickness of an intended magnetic head and a margin to cut it on a surface of the substrate 7 of crystalline glass. An angle $\phi$ made by side walls 9 of the V-shaped grooves 11 where a soft magnetic alloy thin film eventually serving as the magnetic core 3 is to be formed and a normal line of an initial surface of the substrate 7, and the pitch A are determined by a width of the magnetic core 3 and an azimuth required for the intended magnetic head 1.

Figure 5:
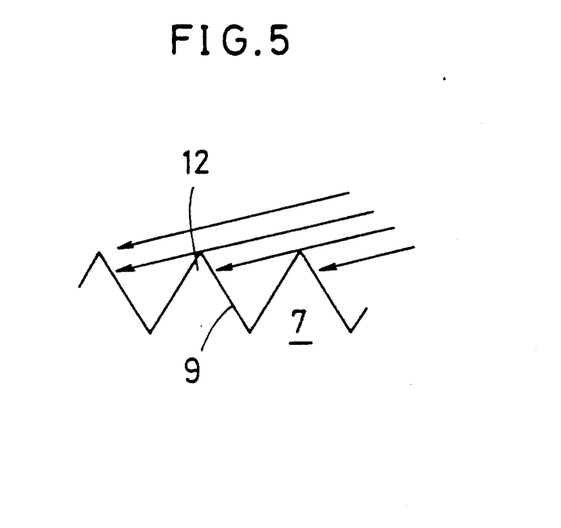
Figure 6:
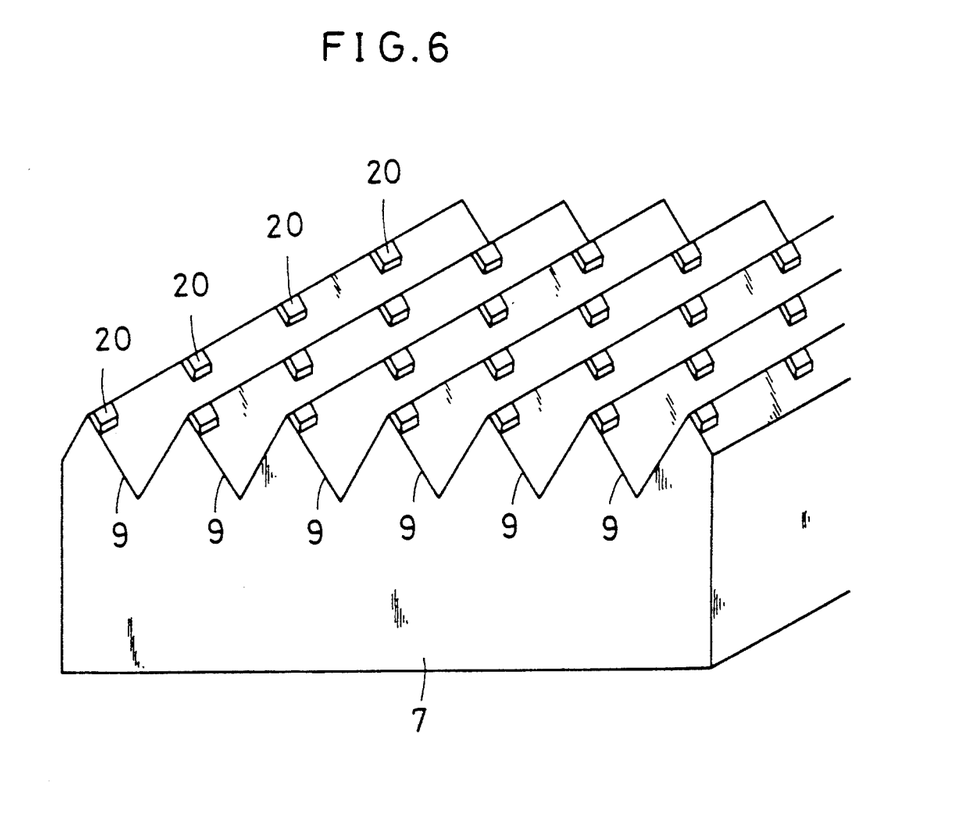

Then, as shown in FIGS. 5 and 6, a means for defining a formation region of a thin film, such as a metal mask and the like, and a self-shadowing effect of a top 12 of each of the side walls 9 of the V-shaped grooves 11 are utilized together to form a nonmagnetic thin film 20 on the side walls 9 of the V-shaped grooves 11 and in only a part corresponding to the front gap 5 of the intended magnetic head 1 by a thin film formation means, such as electron beam vacuum deposition, sputtering, or the like. The nonmagnetic thin film 20 has such a thickness that the magnetic core in a back gap 6 in the magnetic head 1 may be wider than that in the magnetic core in the front gap 5. An upper limit of the thickness corresponds to a difference between a thickness of the magnetic core required for a track width of the magnetic head 1 and a thickness of the magnetic core in any other part. It is preferable that the thickness of the nonmagnetic thin film 20 is about ½ of the difference between the thickness of the magnetic core required for a track width of the magnetic head 1 and the thickness of the magnetic core in any other part. Since the thickness of the nonmagnetic thin film 20 is several microns to several tens microns, a material of the nonmagnetic thin film may preferably be an oxide or a composite oxide, such as alumina, magnesia, steatite, forsterite, etc., which is approximately equal in thermal expansion to the substrate 7.

Figure 7:
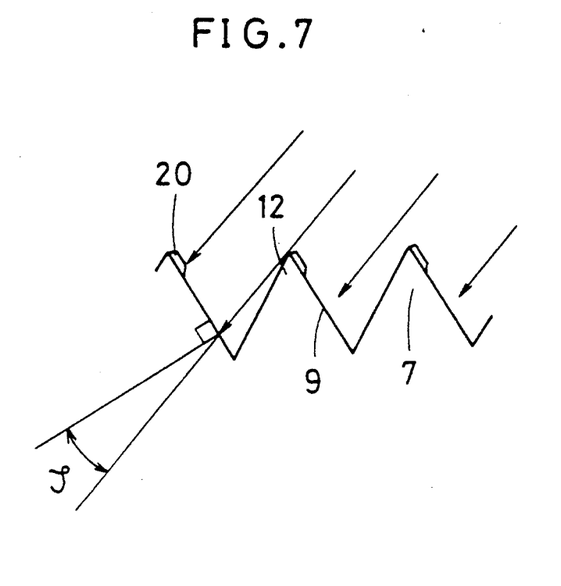
Figure 8:
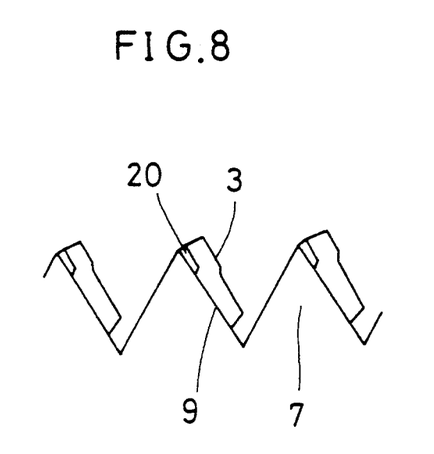

Next, as shown in FIGS. 7 and 8, the FeAlSi family alloy thin film 3 is formed on the side walls 9, where the nonmagnetic thin film 20 is partially formed, by a thin film formation means, such as electron beam vacuum deposition, sputtering, etc., so as to have a larger thickness than that required for the track width of the magnetic head 1. In such a method where a film is deposited under a considerably high degree of vacuum, a mean-free-path of particles which contribute to a vacuum deposition is sufficiently long, and hence, appropriately setting an incident angle of the particles to be deposited, the FeAlSi family alloy thin film 3 can be formed on only one side of each of the side walls 9 by a shadowing effect of the top 12 adjacent to the side of each side wall 9, as shown in FIG. 7. Preferably, allowing for a frequency region where the magnetic head 1 operates, the magnetic core 3 has a multi-stratum structure where insulating layers of $SiO_2$ or the like is sandwiched by metal films 3. Moreover, after the soft magnetic alloy thin film 3 is formed with the thickness required for the track width of the magnetic head 1, the soft nonmagnetic alloy thin film is thickened through a thin film of approximately 1 μm thickness and of metal used for a mask in ion milling in a latter step (e.g., Ti of which selection ratio can be obtained to the soft nonmagnetic thin film in the ion milling). In this way, even if there is a slight nonuniformity in a rate of the ion milling in a step mentioned below, the magnetic head having a specified track width can be obtained with a high yield by setting a condition of a slight overmilling.

Figure 9:
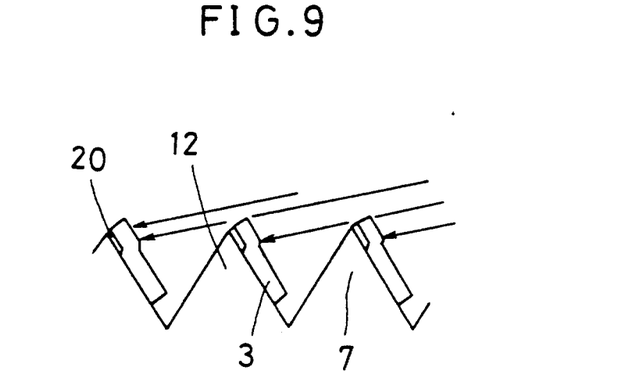

Then, as shown in FIG. 9, a means for defining a region where a metal mask and the like are to be etched and a self-shadowing effect of the top 12 of the side walls 9 are utilized together to apply an ion milling so that only a part of the soft magnetic alloy thin film 3 in the front gap 5 of the magnetic head 1 may have a suitable thickness to the track width.

Figure 10:
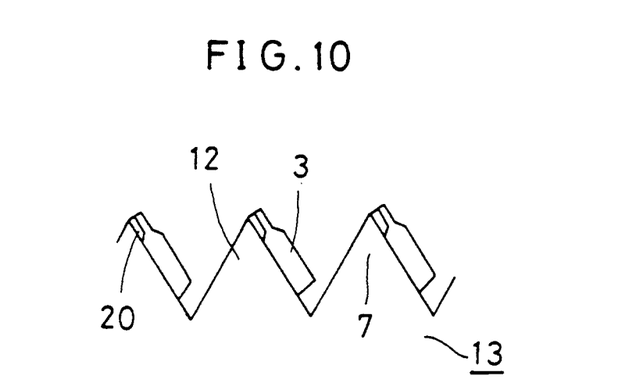

As a result of the above-mentioned steps, as shown in FIG. 10, a core block base material 13 is prepared, where the thickness of the magnetic core 3 in the front gap 5, on which the track width of the magnetic head 1 depends, is smaller than the thickness in any other part, and the soft magnetic alloy thin film 3 is provided which is the magnetic core 3 thinned by the deposited-area-confined non-magnetic film and the glass 8 on opposite side cut into the magnetic core 3 from opposite sides thereof in the front gap 5.

Figure 11:
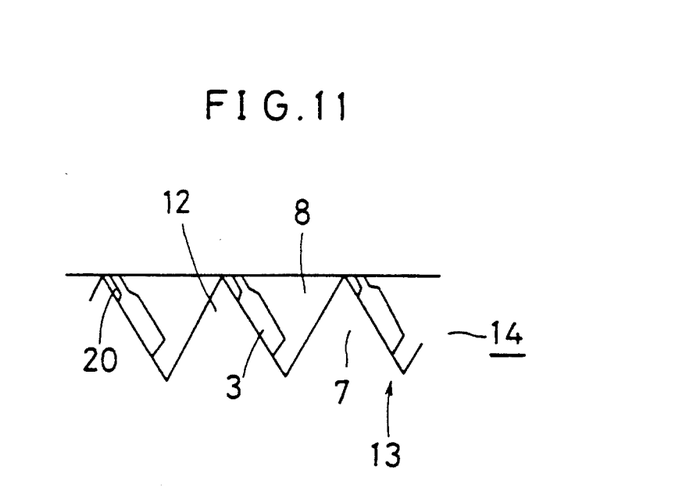

Then, after successive deposition of SiO$_2$ or the like for passivation and metal (Cr or the like) for assuring good wetting of glass (not shown) on the side walls of the V-shaped grooves 11, the V-shaped grooves are filled with the low-melting-point glass 8 as shown in FIG. 11, and the excessive low-melting-point glass 8 is removed to flatten an upper surface of the substrate. In this way, a core block 14 can be obtained.

Figure 12:
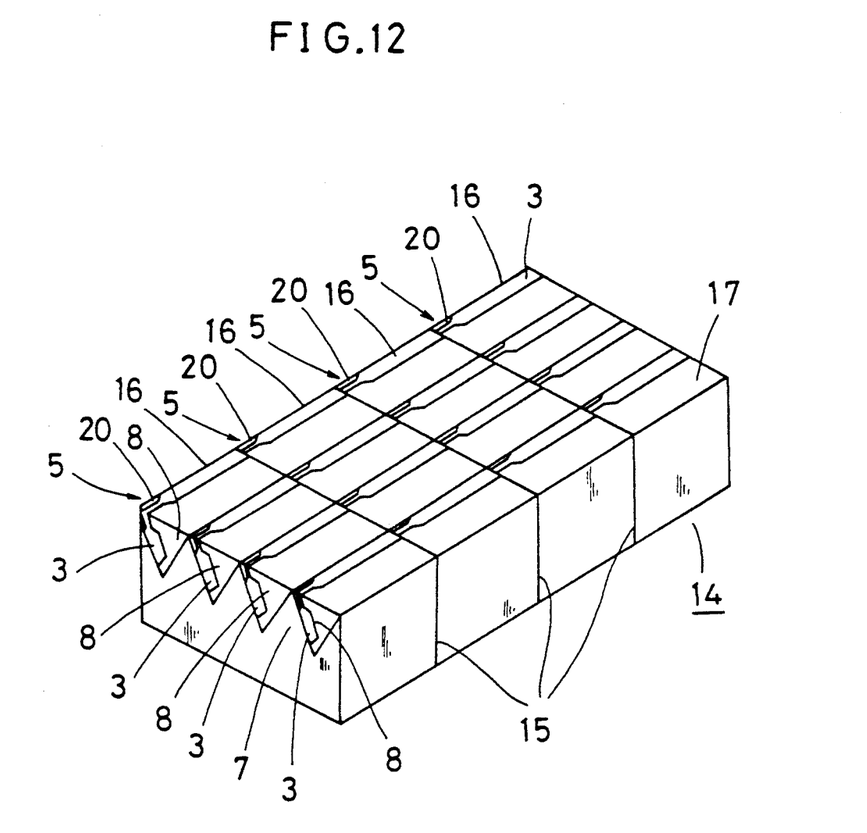

Then, as shown in FIG. 12, the core block 14 is cut along a plane 15 orthogonal to both a bottom surface of the nonmagnetic substrate 7 and the V-shaped grooves 11 at a predetermined pitch to form core pieces 16. At this time, the front gap 5 must be registered to an edge of each of the core pieces 16. In FIG. 12, for simplification, the single core block 14 is depicted as it is divided into four, but in practice it may be divided into more pieces.

Figure 13:
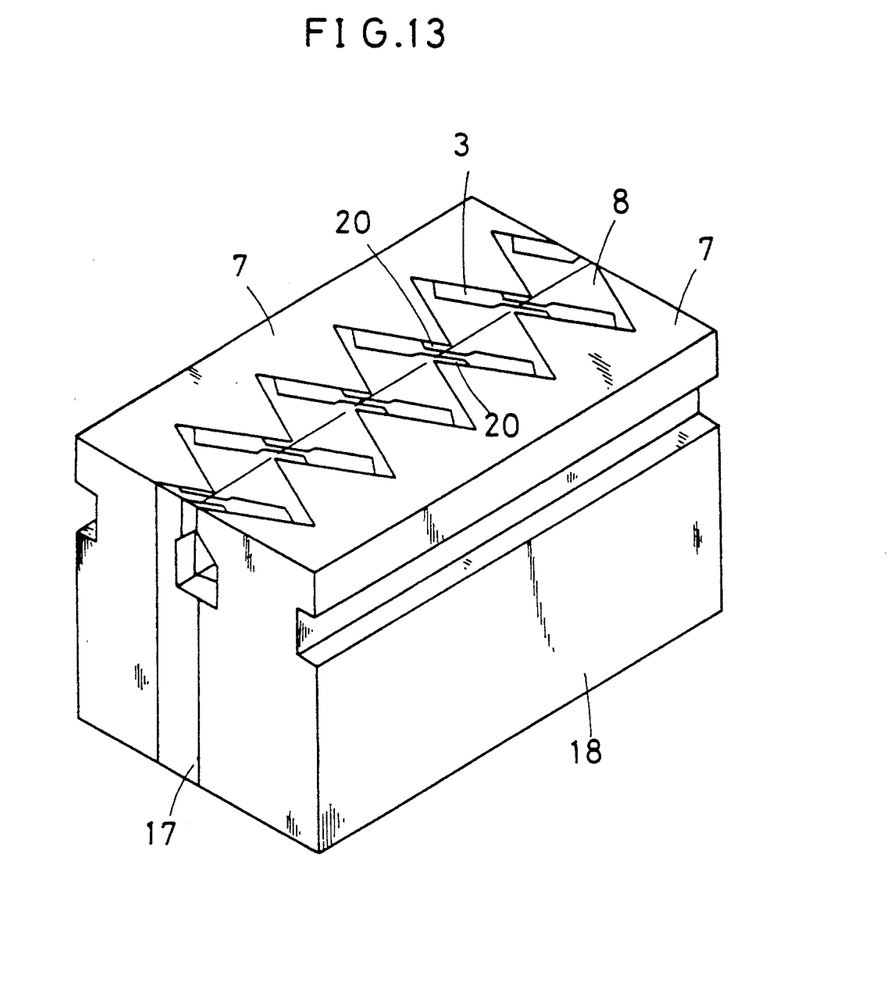

The core pieces 16 obtained in this way are subjected to a process similar to a well-known VCR ferrite head; for example, steps of forming grooves which is to be windows for coiling wire, finely polishing opposed exposed planes of the gap (gap facing planes), and forming gap spacers. In this case, of the very planes of the gap are shown by reference numeral 17 in FIG. 12. After that, as shown in FIG. 13, a pair of the core pieces 16 are bonded by glass under the condition that temperature is raised until the low-melting-point glass 8 has an adhesive force while the core pieces 16 are pressed having their respective magnetic cores 3 which are exposed in the respective gap facing planes registered with each other, and consequently, a magnetic head core block 18 is formed. The magnetic head core block 18 is composed of a plurality of magnetic head chips 19 connected to one another, and it is sliced into the separate magnetic head chips 19 in the next step.

Figure 14:
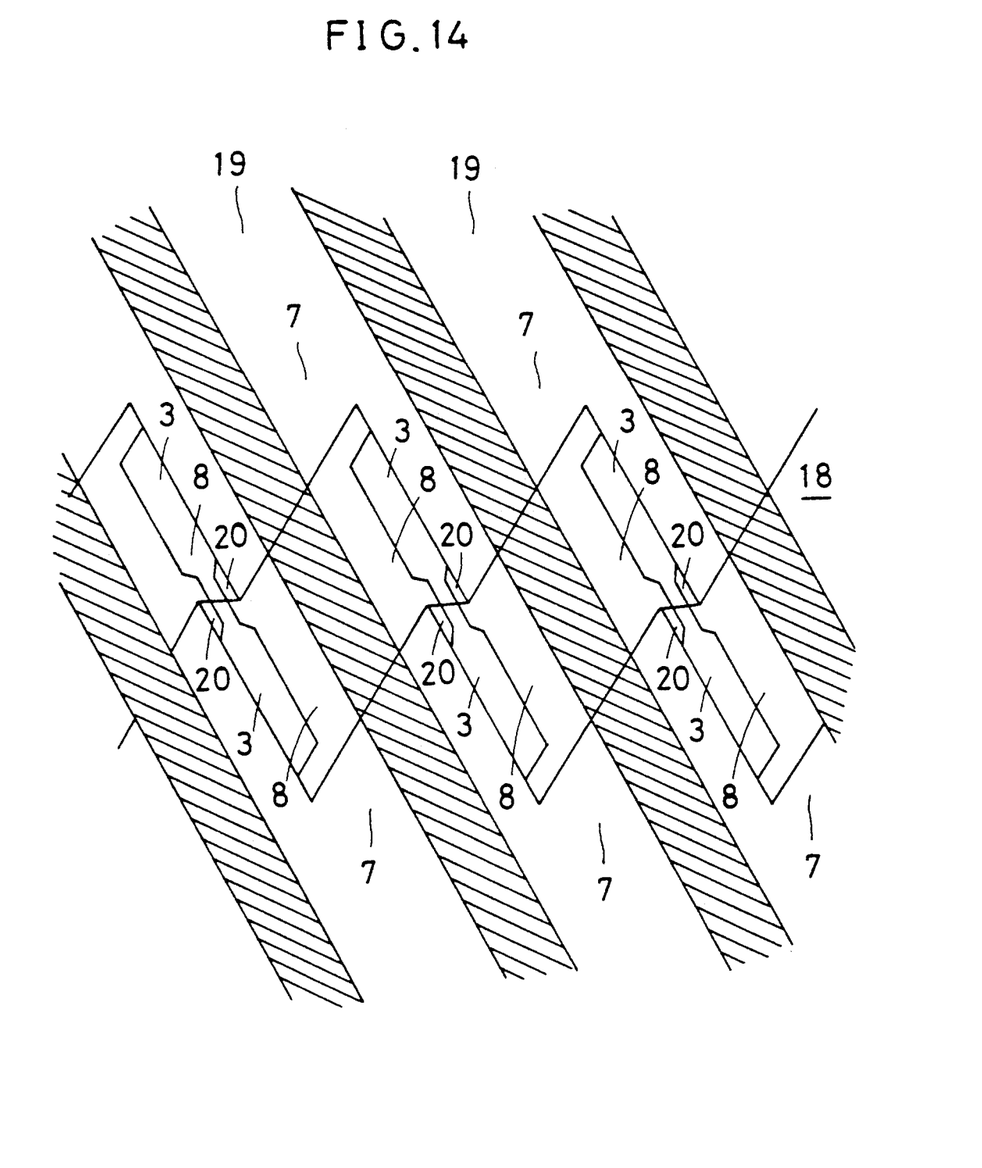

Specifically, as shown in FIG. 14, the magnetic head core block 18 is sliced at a margin which is hatched in the drawing. Depending upon a shape and a pitch of the V-shaped grooves 11, a cutting plane is sometimes not parallel with the magnetic core 3.

The magnetic head chips 19 thus obtained, similar to a conventional magnetic head, require a finish treatment, such as fixing to a base plate by glueing, coiling, tape polishing and the like, to complete the magnetic head 1 (see FIGS. 1 and 2).

When a magnetic core in a back gap of a magnetic head is thickened to reduce a magnetic reluctance and enhance a core efficiency, the magnetic core in a front gap is configured so that it is thinned by a substrate and an element opposite to the substrate cut into the magnetic core from opposite sides thereof in the very part, and therefore, in a gap facing plane where halves of a pair of magnetic cores join together, the magnetic cores are registered with each other so that they can be opposed to each other in a larger width in the back gap than in the front gap. As a result, even if a tolerance of a process in manufacturing is considerably loosened, a magnetic head with high core efficiency can be obtained with a high yield.

What is claimed is:

1. A method of manufacturing a magnetic head in which two substrates provided with magnetic cores of magnetic film on their surface are bonded on a plane so that a magnetic gap is defined between the magnetic cores, comprising the steps of forming a plurality of straight V-shaped grooves in parallel with each other on upper surfaces of the substrates; forming nonmagnetic films at a specified pitch close to tops of side walls of the grooves; forming magnetic films on the side walls of the V-shaped grooves having the nonmagnetic films thereon; thinning the magnetic films from the upper to a specified depth; filling the grooves with glass and then flattening upper surfaces of the substrates; cutting the substrates along a plane orthogonal to the V-shaped grooves to divide them into first and second substrates; forming grooves for coiling in top and bottom surfaces of each of the first and second substrates in a direction orthogonal to the V-shaped grooves; superposing the first substrate on the second substrate so that the first and second substrates have their respective upper surfaces in contact with each other and that the magnetic films of the first substrate and those of the second substrate together define a magnetic gap and then melting the glass in the V-shaped grooves and bonding the first and second substrates to join in a unity; and slicing the unity along a plane inclined at a specified angle related to a junction plane between the first and second substrates.

2. A method according to claim 1, wherein the nonmagnetic films are formed by a thin film formation means in the step of forming the non magnetic films on the side walls of the V-shaped grooves.

3. A method according to claim 1, wherein the magnetic films are formed by a thin film formation means in the step of forming the magnetic films on the side walls of the V-shaped grooves.

4. A method according to claim 1, wherein the magnetic films are treated by ion milling to be thinner in the step of thinning the magnetic films.

5. A method according to claim 1, wherein the magnetic films formed on the side walls of the V-shaped grooves make strata of alternating soft magnetic metal films and electric insulating films.

6. A method according to claim 1, wherein the nonmagnetic films are formed in a thickness of about ½ of a difference between a thickness of the magnetic cores required for a track width of the magnetic head and a thickness of the magnetic cores in any other part in the step of forming the nonmagnetic films on the side walls of the V-shaped grooves.

7. A method according to claim 1, wherein the nonmagnetic films are of an oxide or a composite oxide.

* * * * *